United States Patent [19]
Komatsuda et al.

[11] Patent Number: 5,531,203
[45] Date of Patent: Jul. 2, 1996

[54] CATALYST ACTIVATING SYSTEM IN MULTI-CYLINDER INTERNAL COMBUSTION ENGINE

[75] Inventors: Takashi Komatsuda; Hiroaki Kato; Yuichi Shimasaki; Akihisa Saito; Toshikazu Oketani; Takuya Aoki, all of Wako, Japan

[73] Assignee: Honda Giken Kogyo Kabushiki Kaisha, Tokyo, Japan

[21] Appl. No.: 377,736

[22] Filed: Jan. 25, 1995

[30] Foreign Application Priority Data

Jan. 25, 1994 [JP] Japan ................................ 6547/94

[51] Int. Cl.$^6$ .................................................. F02D 7/00
[52] U.S. Cl. .................................................. 123/481
[58] Field of Search ............................ 123/481, 90.15, 123/90.16, 90.17; 60/280, 285, 277, 276, 294

[56] References Cited

U.S. PATENT DOCUMENTS

| | | | |
|---|---|---|---|
| 4,165,610 | 8/1979 | Iizuka et al. | 60/285 |
| 4,319,451 | 3/1982 | Tajima et al. | 60/285 |
| 4,960,083 | 10/1990 | Seki et al. | 60/285 |
| 5,233,831 | 8/1993 | Hitomi et al. | 60/284 |
| 5,273,006 | 12/1993 | Schapertons et al. | 123/90.16 |
| 5,280,770 | 1/1994 | Satou et al. | 123/90.15 |
| 5,287,830 | 2/1994 | Dopson et al. | 123/90.16 |
| 5,297,505 | 3/1994 | Doll et al. | 123/90.16 |
| 5,297,506 | 3/1994 | Reckzugel et al. | 123/90.16 |
| 5,297,516 | 3/1994 | Hara | 123/90.16 |
| 5,353,756 | 10/1994 | Murata et al. | 123/90.16 |
| 5,398,502 | 3/1995 | Watanabe | 60/284 |

*Primary Examiner*—Raymond A. Nelli
*Attorney, Agent, or Firm*—Nikaido, Marmelstein, Murray & Oram

[57] ABSTRACT

In a multi-cylinder internal combustion engine including a plurality of fuel injection valves corresponding to a plurality of cylinders, respectively, and a catalytic converter provided in an exhaust system common to the cylinders, the concentration of oxygen in the exhaust gas from the engine is precisely controlled in accordance with the operational condition of the engine in a low-temperature state of the engine for the prompt activation of the catalyst. When the engine is at a low temperature, the operation of the fuel injection valves is controlled so as to stop the supplying of a fuel into the particular cylinders and, the operation of a valve operating characteristic changing means is controlled to adjust the amounts of air drawn and discharged on the basis of conditions detected by operational condition detecting means and at such low temperature to thereby control the oxygen supplied to the catalyst in the catalytic converter whereby the activity of the catalyst can be controlled.

20 Claims, 5 Drawing Sheets

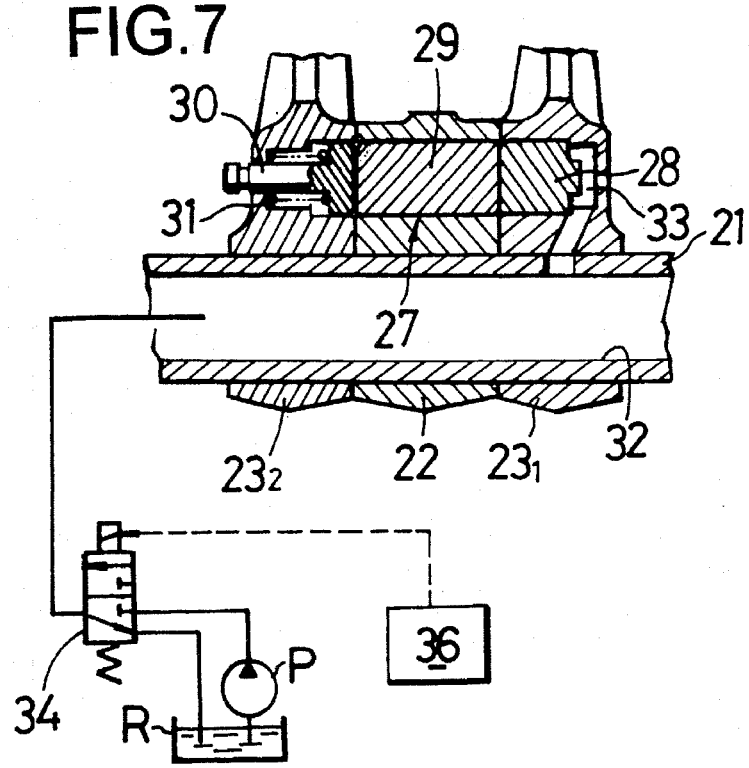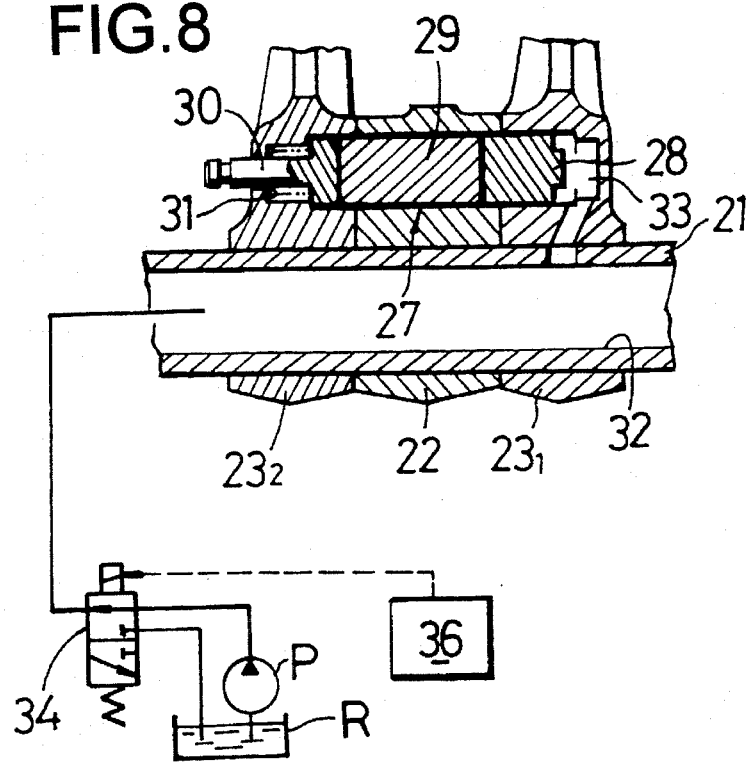

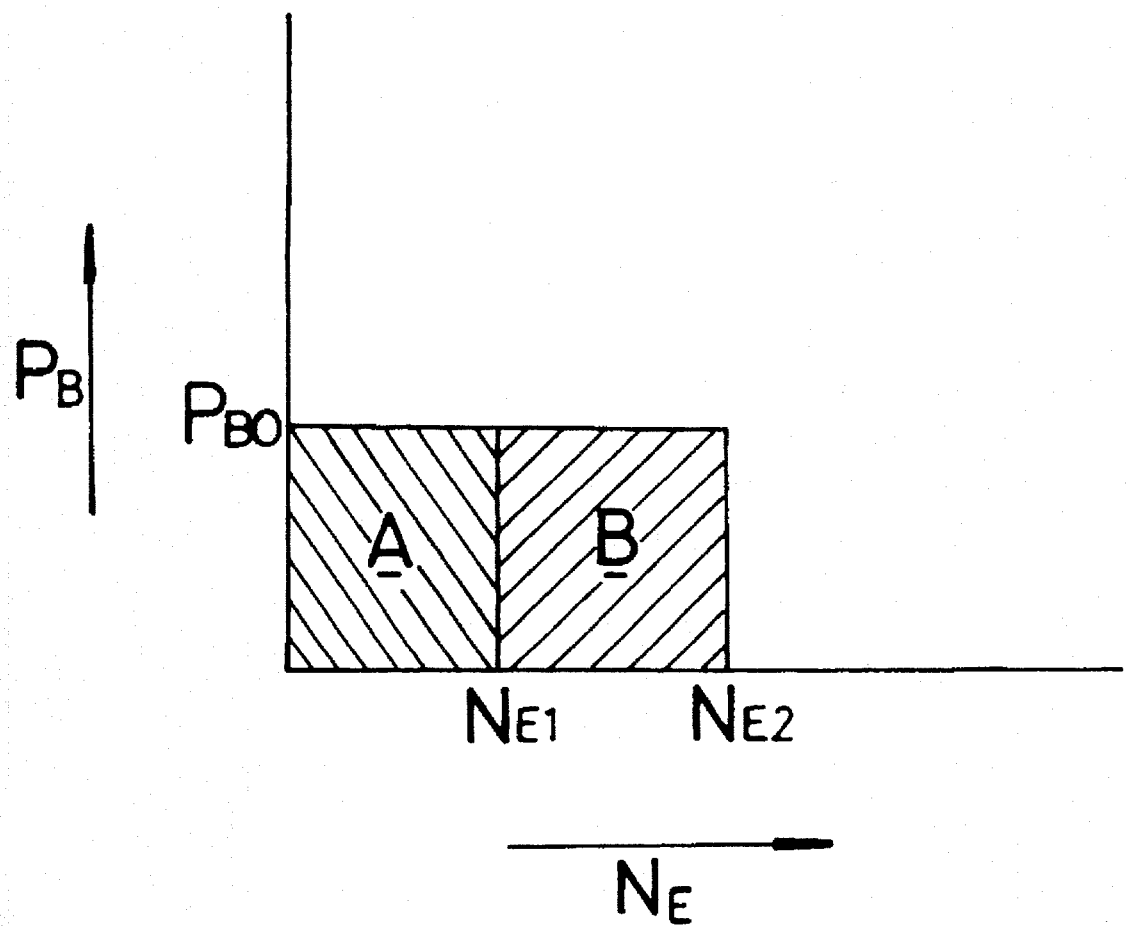

CATALYST ACTIVATING SYSTEM IN MULTI-CYLINDER INTERNAL COMBUSTION ENGINE

BACKGROUND OF THE INVENTION

1. Field of the Invention

The present invention relates to a catalyst activating system in a multi-cylinder internal combustion engine comprising a plurality of fuel injection valves individually corresponding to a plurality of cylinders. A catalytic converter is provided in an exhaust system common to the cylinders, wherein the concentration of oxygen in an exhaust gas can be controlled in order to activate a catalyst within the catalyst converter, when the engine is at a low temperature.

2. Description of the Prior Art

A catalyst activating system is conventionally known, for example, from Japanese Patent Application Laid-open No. 19627/90.

In the above prior art system, the concentration of oxygen in the exhaust gas is increased by stopping the supplying of the fuel into the particular cylinder in a low-temperature state of the engine, thereby promoting the oxidizing reaction in the catalyst to promote the activation of the catalyst. However, if the concentration of oxygen in the exhaust gas is intended to be controlled only by stopping the supplying of the fuel into the particular cylinder in this manner, the concentration of oxygen can be varied only by the control of the number of cylinders to which the supply of the fuel is stopped, and it is difficult to more precisely control the concentration of oxygen in accordance with the operational condition of the engine.

SUMMARY OF THE INVENTION

Accordingly, it is an object of the present invention to provide a catalyst activating system in a multi-cylinder internal combustion engine, wherein the concentration of oxygen in the exhaust gas can be more precisely controlled in accordance with the operational condition of the engine in a low-temperature state of the engine, to promptly activate the catalyst.

To achieve the above object, the present invention provides a catalyst activating system in a multi-cylinder combustion engine, having a plurality of fuel injection valves individually corresponding to a plurality of cylinders and a catalytic converter provided in an exhaust system common to the cylinders. The catalyst activating system comprises an operational condition detecting means for detecting the operational conditions of the engine; a valve operating characteristic changing means capable of changing the valve operating characteristic of at least one of the intake valves and of the exhaust valves in at least one of the cylinders; and a control means for controlling the operation of the fuel injection valve so as to stop the supply of fuel into the particular cylinder when the engine is at a low temperature, and for controlling the operation of the valve operating characteristic changing means so as to adjust the amounts of air drawn and discharged on the basis of the conditions detected by the operational conditions detecting means.

With the above arrangement, it is possible to more precisely control the concentration of oxygen in the exhaust gas by adjusting the amounts of air drawn and discharged in accordance with the operational conditions of the engine in the low-temperature state of the engine, thereby promptly activating the catalyst.

The above and other objects, features and advantages of the invention will become apparent from the following description of a preferred embodiment taken in conjunction with the accompanying drawings.

BRIEF DESCRIPTION OF THE DRAWINGS

FIG. 7 is a sectional view taken along a line 7—7 in FIG. 6 in a valve-stopped state;

FIG. 8 is a sectional view similar to FIG. 7, but in a valve-operating state; and FIG. 9 is a diagram illustrating control regions depending upon the operational condition of an engine.

DESCRIPTION OF THE PREFERRED EMBODIMENT

The present invention will now be described by way of a preferred embodiment with reference to the accompanying drawings.

Figure 1:
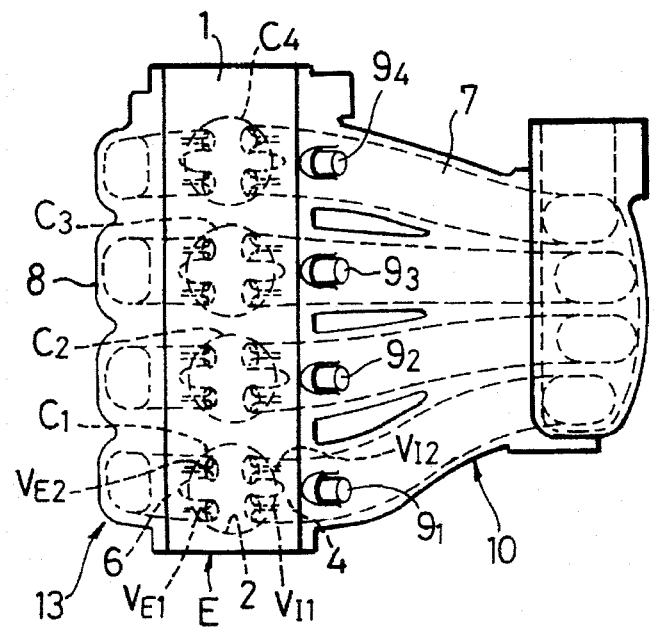
FIG. 1 is a plan view of a multi-cylinder internal combustion engine.
Figure 2:
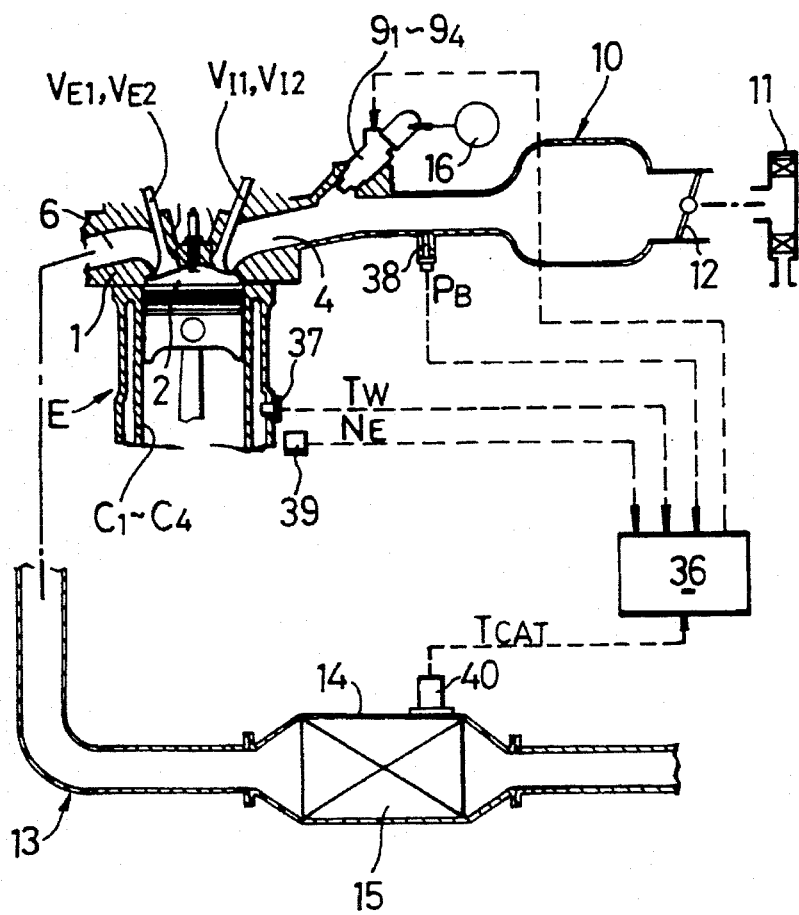
FIG. 2 is a schematic view of an arrangement of intake and exhaust systems.
Figure 3:
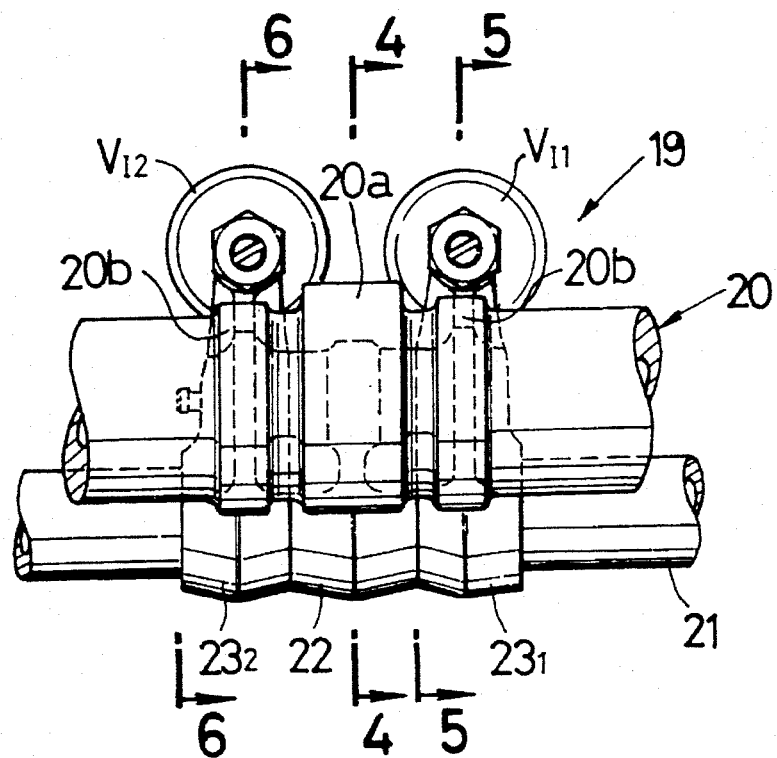
FIG. 3 is a plan view of a valve operating device for each of cylinders in accordance with the present invention.

Referring first to FIGS. 1 and 2, first, second, third and fourth cylinders $C_1$, $C_2$, $C_3$ and $C_4$ are arranged side-by-side in an engine body E. A pair of intake valves $V_{I1}$ and $V_{I2}$ and a pair of exhaust valve $V_{E1}$ and $V_{E2}$ are positioned in a cylinder head 1 in the engine body E for each of the cylinders $C_1$, $C_2$, $C_3$ and $C_4$. The pair of intake valves $V_{I1}$ and $V_{I2}$ are provided for connecting and disconnecting each combustion chamber 2 with each intake port 4; the pair of exhaust valves $V_{I1}$ and $V_{I2}$ are provided for connecting and disconnecting each combustion chamber 2 with each exhaust port 6.

The intake ports 4 of the cylinders $C_1$ to $C_4$ are connected to branches of an intake manifold 7. The exhaust ports 6 in the cylinders $C_1$ to $C_4$ are connected to branches of an exhaust manifold 8, respectively. Moreover, fuel injection valves $9_1$, $9_2$, $9_3$ and $9_4$ are disposed in portions of the branches of the intake manifold 7 near the cylinder head 1 for injecting a fuel toward the intake ports 4, respectively.

Referring to FIG. 2, an intake system 10 including the intake manifold 7 connected to the intake port 4 has an air cleaner 11 at is upstream end. A throttle valve 12 is located between the air cleaner 11 and the intake manifold 7 in the intake system 10. A catalytic converter 14 is incorporated in an intermediate portion of the exhaust system 13, the exhaust system including the exhaust manifold 8 connected to the exhaust ports 6. A ternary catalyst 15 is filled in the catalytic converter 14. Further, a fuel supply source 16 is connected to the fuel injection valves $9_1$ to $9_4$.

Figure 4:
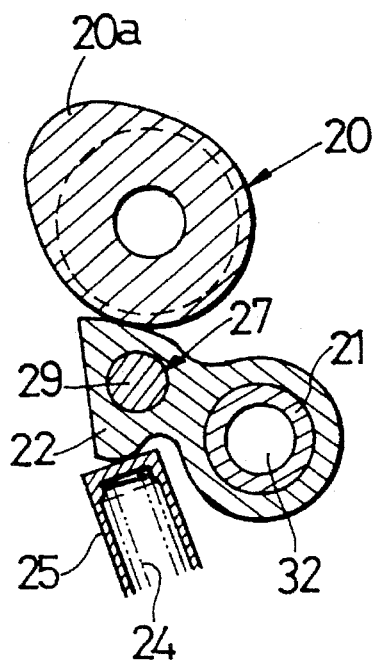
FIG. 4 is a sectional view taken along a line 4—4 in FIG. 3.

Referring to FIGS. 3 to 6, a valve operating device 19 opens and closes the intake valves $V_{I1}$ and $V_{I2}$ for the first cylinder $C_1$. The valve operating device 19 includes a cam shaft 20 driven at a reduction ratio of 2/1 by a crankshaft which is not shown; a rocker arm shaft 21 parallel to the cam shaft 20; a free rocker arm 22 swingably mounted on the rocker shaft 21, such that it can be freed with respect to the intake valves $V_{I1}$ and $V_{I2}$; and first and second driving rocker arms $23_1$ and $23_2$ swingably mounted on the rocker arm shaft 21 on the opposite sides of the free rocker arm 22 and operatively connected to the intake valves $V_1$ and $V_{I2}$, respectively. The cam shaft 20 is integrally formed with a usual operating cam 20a which is in sliding contact with an upper surface of the free rocker arm 22, and first and second circular stopping cams 20b, which are in sliding contact with upper surfaces of the first and second driving rocker arms $23_1$ and $23_2$, respectively. As shown in FIG. 4, the free rocker arm 22 is biased in a direction to abut against the operating cam 20a by a spring 24 through a guide piston 25.

Figure 5:
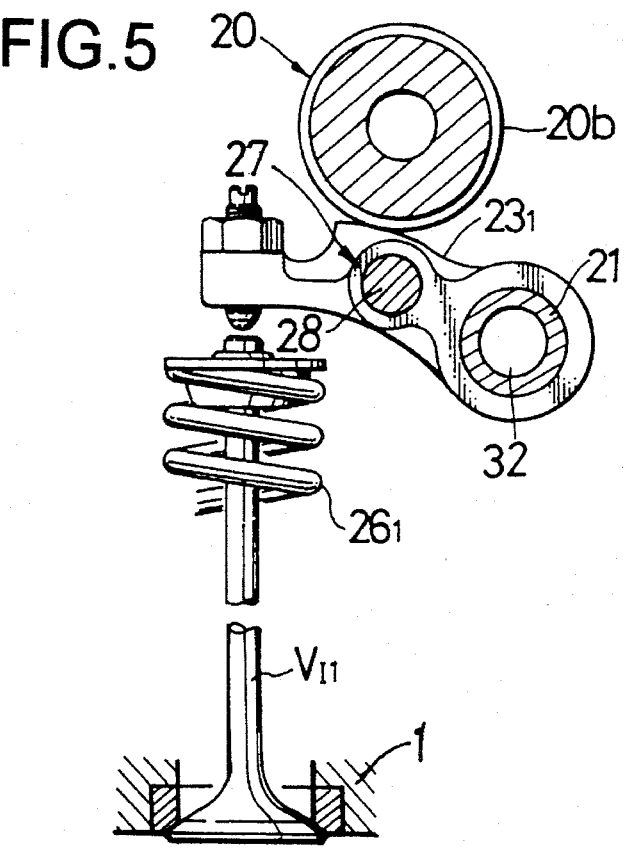
FIG. 5 is a sectional view taken along a line 5—5 in FIG. 3.
Figure 6:
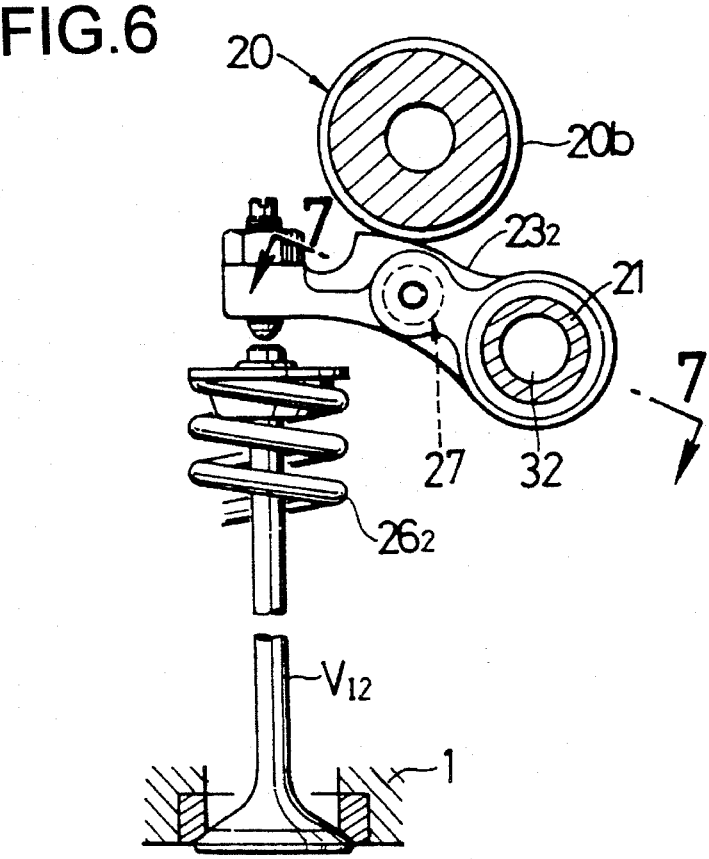
FIG. 6 is a sectional view taken along a line 6—6 in FIG. 3.

As shown in FIGS. 5 and 6, the first and second driving rocker arms $23_1$ and $23_2$ are positioned such that their tip ends can urge heads of the intake valves $V_{I1}$ and $V_{I2}$ which are biased in their valve-closing directions by valve springs $26_1$ and $26_2$.

As shown in FIG. 7, a valve operating characteristic changing means 27 is provided in the free rocker arm 22 and the first and second driving rocker arms $23_1$ and $23_2$. The valve operating characteristic changing means 27 changes the valve operating characteristics of the intake valves $V_{I1}$ and $V_{I2}$ by switching between a state in which the first and second driving rocker arms $23_1$ and $23_2$ are disconnected from the free rocker arm 22, and a state in which the first and second driving rocker arms $23_2$ and $23_2$ are connected to the free rocker arm 22.

The valve operating characteristic changing means, which changes the opening and closing operation of the valve operating device, 27 includes: a connecting piston 28 for connecting the first driving rocker arm $23_1$ and the free rocker arm 22 to each other; a connecting pin 29 for connecting the free rocker arm 22 and the second driving rocker arm $23_2$ to each other; a limiting member 30 which abuts against the connecting pin 29 on the opposite side from the connecting piston 28; and a return spring 31 for biasing the connecting piston 28, the connecting pin 29 and the limiting member 30 in a disconnecting direction, i.e., toward the right as viewed in FIG. 7.

The connecting piston 28 is slidably fitted into the first driving rocker arm $23_1$ for sliding movement in an axial direction parallel to the rocker arm shaft 21. A hydraulic pressure chamber 33 is defined between one end of the connecting piston 28 and the first driving rocker arm $23_1$, the pressure chamber 33 being connected to an oil passage 32 provided within the rocker arm shaft 21. The oil passage 32 is connected to a connection switchover solenoid control valve 34 which is shiftable between a first state to connect a hydraulic pump P to the oil passage 32 and a second state to connect a reservoir R to the oil passage 32.

The connecting pin 29 abutting at one end against the other end of the connecting piston 28, is slidably fitted into the free rocker arm 22 for sliding movement in an axial direction parallel to the rocker arm shaft 21. The limiting member 30 abutting against the other end of the connecting pin 29, is slidably fitted into the second driving rocker arm $23_2$ for sliding movement in an axial direction parallel to the rocker arm shaft 21, and the return spring 31 is compressed between the limiting member 30 and the second driving rocker arm $23_2$.

When the valve operating characteristic changing means 27 is in a state or mode in which the hydraulic pressure in the hydraulic pressure chamber 33 has been released, the limiting member 30, the connecting pin 29 and the connecting piston 28 are moved toward the hydraulic pressure chamber 33 by a spring force of the return spring 31. Abutting surfaces of the connecting piston 28 and the connecting pin 29 are at positions aligned with the contacting surfaces of the first driving rocker arm $23_1$ and the free rocker arm 22, and the abutting surfaces of the connecting pin 29 and the limiting member 30 are at positions aligned with the contacting surfaces of the free rocker arm 22 and the second driving rocker arm $23_2$. Thus, the rocker arms 22, $23_1$ and $23_2$ are swingable relative to one another, and the intake valves $V_{I1}$ and $V_{I2}$ are closed and operatively stopped by the first and second stopping cams 20b.

If a hydraulic pressure is applied to the hydraulic pressure chamber 33 as shown in FIG. 8, the valve operating characteristic changing means is changed to a second mode in which the connecting piston 28 receives hydraulic pressure and moves the connecting pin 29 and the limiting member 30 in a direction away from the hydraulic pressure chamber 33, the other end of the connecting piston 28 is fitted into the free rocker arm 22 to connect the first driving rocker arm $23_1$ and the free rocker arm 22 to each other, and the other end of the connecting pin 29 is fitted into the second driving rocker arm $23_2$ to connect the free rocker arm 22 and the second driving rocker arm $23_2$ to each other. Thus, the first and second driving rocker arms $23_1$ and $23_2$ swing with the free rocker arm 22, which is moved by the operating cam 20a, thereby causing the intake valves $V_{I1}$ and $V_{I2}$ to be opened and closed with a timing and a lift amount which are determined by the operating cam 20a.

A valve operation device (not shown) for opening and closing the exhaust valves $V_{E1}$ and $V_{E2}$ for the first cylinder $C_1$ is constructed in the same manner as the valve operating device 19, and includes a valve operating characteristic changing means 27 which is shiftable between a state in which the exhaust valves $V_{E1}$ and $V_{E2}$ are operatively stopped, and a state in which the exhaust valves $V_{I1}$ and $V_{I2}$ are opened and closed. The intake valves $V_{I1}$ and $V_{I2}$ and the exhaust valves $V_{I1}$ and $V_{I2}$ for the second to fourth cylinders $C_2$ to $C_4$ are normally opened and closed when the engine is in operation.

The amount of fuel injected by each of the fuel injection valves $9_1$ to $9_4$ corresponding to the cylinders $C_1$ to $C_4$ is controlled by a control means 36 in accordance with the operational conditions of the engine. The operation of the connection switchover solenoid valve 34 in the valve operating characteristic changing means 27, which changes the valve operating characteristics of the intake valves $V_{I1}$ and $V_{I2}$ and the exhaust valves $V_{E1}$ and $V_{E2}$ for the first cylinder $V_{I1}$, is also controlled by the control means 36. The control means 36 controls the operation of the fuel injection valves $9_1$ and $9_2$ to stop the supply of the fuel into the particular cylinders $C_1$ and $C_2$ when the engine is at a low temperature, and controls the operation of the valve operating characteristic changing means 27 for the first cylinder $C_1$ to change modes and thereby to adjust the amounts of air drawn and discharged in accordance with the operational conditions of the engine at the low temperature. The controls by the control means 36 are carried out at predetermined time intervals or at predetermined crank angles.

Inputted to the control means 36 are detection values detected by: a water-temperature detector 37 for detecting a temperature $T_W$ of cooling water in order to determine whether or not the engine is at the low temperature; an intake pressure detector 38 as a first operational condition detecting means for detecting an intake pressure $P_B$ as the operational condition of the engine; an engine revolution detector 39 as a second operational condition detecting means, for detecting a number $N_E$ of revolutions per minute of the engine as the operational condition of the engine; and a catalyst-temperature detector 40 for detecting a temperature $T_{CAT}$ of the ternary catalyst 15 in the catalytic converter 14.

The control means 36 controls the fuel injection valves $9_1$ and $9_2$ and the valve operating characteristic changing means 27, such that the supply of fuel into the first and second cylinders $C_1$ and $C_2$ is stopped and at the same time, the intake valves $V_{I1}$ and $V_{I2}$ and the exhaust valves $V_{E1}$ and $V_{I2}$ are operatively stopped in a low temperature state of the engine, for example, when the temperature $T_W$ of the cooling water is in a range of $10°\ C. \leq T_W \leq 40°\ C.$ after completion of the start of the engine E, and in a region A shown in FIG. 9. In region B in FIG. 9, only the supply of fuel into the first and second cylinders $C_1$ and $C_2$ is stopped, and the intake valves $V_{I1}$ and $V_{I2}$ and the exhaust valves $V_{E1}$ and $V_{E2}$ are operated. In the region A, the number $N_E$ of revolutions of the engine is set at a first preset revolution-number $N_{E1}$ (e.g., 2,000 rpm) or less, and the intake pressure $P_B$ is set at a preset intake pressure $P_{B0}$ (e.g., −400 mm Hg) or less. In the region B, the number $N_E$ of revolution-number $N_{E2}$ (e.g., 3,500 rpm) or less beyond the first preset revolution-number $N_{E1}$, and the intake pressure $P_B$ is set at the preset intake pressure $P_{B0}$ or less. In a region other than the regions A and B, the amount of fuel injected by each of the fuel injection valves $9_1$ to $9_4$ for the cylinders $C_1$ to $C_4$ is controlled dependent upon the operational conditions of the engine, and the intake valves $V_{I1}$ and $V_{I2}$ and the exhaust valves $V_{E1}$ and $V_{E2}$ are opened and closed with normal operating characteristics.

When the combustion is unstable immediately after the start of the engine, and when $N_E$ the speed of the engine is extremely low in an extremely low temperature state, or when the engine is in an operational condition in which the temperature of an exhaust gas is high at a high load and at a high engine speed $N_E$, the control to stop the injection of the fuel by the fuel injection valves $9_1$ and $9_2$ and to operatively stop the intake valves $V_{I1}$ and $V_{I2}$ and the exhaust valves $V_{E1}$ and $V_{E2}$ is not carried out. Further, even if the temperature $T_W$ of the cooling water rises to a high temperature, i.e., exceeds 40° C., the control to stop the injection of the fuel by the fuel injection valves $9_1$ and $9_2$ and to operatively stop the intake valves $V_{I1}$ and $V_{I2}$ and the exhaust valves $V_{E1}$ and $V_{E2}$ may be continuously carried out, until the temperature $T_{CAT}$ of the catalyst 15 reaches a predetermined temperature (e.g., 300° C.).

The operation of this embodiment will be described below. In a low temperature state of the engine in which the temperature $T_W$ of the cooling water is in a range of $10°\ C. \leq T_W \leq 40°\ C.$ and in the region A in which the engine load is low and the number of revolutions per minute of the engine is also low, the supplying of the fuel to the first and second cylinders $C_1$ and $C_2$ is stopped and at the same time, the intake valves $V_{I1}$ and $V_{I2}$ and the exhaust valves $V_{E1}$ and $V_{E2}$ of the first cylinder $C_1$ are operatively stopped. Therefore, in the first cylinder $C_1$, the combustion and explosion in the combustion chamber 2 cannot occur and also air is not drawn into or discharged from the combustion chamber 2. Further, in the second cylinder $C_2$, the combustion and explosion in the combustion chamber 2 does not occur, but fresh air is drawn into the combustion chamber 2 and is directly discharged from the combustion chamber 2. Thus, the concentration of oxygen in an exhaust gas is increased to promote the oxidizing reaction in the ternary catalyst 15 to therefore promote the activation of the catalyst 15.

In the low temperature state of the engine and in the region B in which the engine load is low but the number of revolution per minute of the engine is high, the supplying of the fuel into the cylinders $C_1$ and $C_2$ remains stopped, but the intake valves $V_{I1}$ and $V_{I2}$ and the exhaust valves $V_{E1}$ and $V_{E2}$ are opened and closed. Thus, in the first and second cylinders $C_1$ and $C_2$, the combustion and explosion in the combustion chamber 2 does not occur, but fresh air is drawn into the combustion chambers 2 in the first and second cylinders $C_1$ and $C_2$ and is directly discharged from the combustion chambers 2. Thus, an exhaust gas having a higher concentration of oxygen than that in the region A is guided to the ternary catalyst 15, thereby promoting the oxidizing reaction in the ternary catalyst 15 to therefore promote the activation of the catalyst 15.

By stopping the supplying of the fuel into the particular cylinders $C_1$ and $C_2$ and adjusting the amounts of air drawn and discharged in accordance with the operational conditions of the engine when the engine is at a low temperature, the concentration of oxygen in the exhaust gas can be precisely controlled, to thereby more promptly activate the ternary catalyst 15.

In the above-described embodiment, all of the intake valves $V_{I1}$ and $V_{I2}$ and the exhaust valves $V_{E1}$ and $V_{E2}$ for the first cylinder $C_1$ have been operatively stopped in the region A shown in FIG. 9. The system could be operated wherein only one of the intake valves $V_{I1}$ and $V_{I2}$ and only one of the exhaust valves $V_{E1}$ and $V_{E2}$ is operatively stopped.

Modifications can be made to the above described embodiment. For example, the number of the intake valves and of the exhaust valves disposed in each of the cylinders $C_1$, $C_2$, $C_3$ and $C_4$ is not limited to a pair. In addition, either one of the intake valves and the exhaust valves in the particular cylinder may be operatively stopped in the low temperature state of the engine. Further, the amounts of air drawn and discharged may be adjusted by changing the lift amount and opened angle of at least one of the intake valves and of the exhaust valves.

Although the embodiment of the present invention has been described in detail, it will be understood that the present invention is not limited to the above-described embodiment, and various modifications in design may be made without departing from the spirit and scope of the invention defined in the claims.

What is claimed:

1. A catalyst activating system in a multi-cylinder combustion engine for activating a catalyst by increasing an amount of oxygen supplied to said catalyst, said engine including a plurality of cylinders, each cylinder having a fuel injection valve operatively associated therewith, at least one intake valve operatively associated therewith, and at least one exhaust valve operatively associated therewith; and a catalytic converter having said catalyst therein, operatively coupled to said cylinders; said catalyst activating system comprising:

(a) detecting means for detecting operational conditions of said engine including engine temperature, engine intake pressure and engine speed;

(b) valve operating means for opening and closing said intake valves and said exhaust valves;

(c) valve opening and closing operation changing means operatively coupled to said valve operating means for changing the opening and closing operation of at least one of said intake valves and at least one of said exhaust valves in at least one of said cylinders between at least two operating modes dependent on at least one of said engine intake pressure and said engine speed detected by said detecting means, wherein in one of said operating modes, said intake valves and exhaust valves are closed and in another of said operating modes, at least one of said intake valves and one of said exhaust valves are opened for at least a predetermined period; and (d) control means for controlling the operation of said fuel injection valves to stop the supply of fuel into at least one of said cylinders and for controlling the operation of said valve opening and closing operation changing means to operate in said one operating mode and said another operating mode, when said engine is at a temperature which is below a predetermined temperature, thereby permitting only air to be fed through said at least one cylinder to said catalyst, whereby the amount of oxygen provided to said catalyst is controlled thereby controlling the activity of said catalyst.

2. A catalyst activating system as set forth in claim 1 wherein:

(a) said valve operating means includes rocker shaft means, first rocker arms swingably mounted on said rocker shaft means, wherein each first rocker arm is associated with one of said intake valves or exhaust valves, second rocker arms, each of said second rocker arm being mounted on said rocker shaft means adjacent at least one of said first rocker arms;

(b) wherein said valve opening and closing operation changing means comprises connecting pin means having a first position for connecting said adjacent first and second rocker arms and a second position for not connecting said adjacent first and second rocker arms; and (c) wherein said control means controls the movement of said connecting pin means between said first and second positions.

3. A catalyst activating system as set forth in claim 2, wherein said control means includes hydraulic means for moving said connecting pin means.

4. A catalyst activating system as set forth in claim 3, wherein said adjacent first and second rocker arms associated with each intake or exhaust valve each include an opening therein, wherein said connecting pin means is positioned in said openings for movement therein, said connecting pin means comprising a pin member, a limiting member abutting against one end of said pin member, and a piston abutting against the other end of said pin member, wherein said piston is moved within said openings by said hydraulic means thereby moving said pin member and said limiting member in said openings.

5. A catalyst activating system as set forth in claim 4, wherein said connecting pin means further includes spring means for biasing said pin member in a direction opposed to the direction of movement of said piston when said hydraulic means is activated.

6. A catalyst activating system as set forth in claim 1, wherein said one operating mode corresponds to a first engine condition where the engine speed is below a first predetermined level, and said another operating mode corresponds to a second engine condition where the engine speed exceeds said first predetermined level but is below a second predetermined level, and wherein a number of cylinders through which only air is passed is larger in said another operating mode than in said one operating modes.

7. A catalyst activating system as set forth in claim 6, wherein said first predetermined level of the engine speed is 2,000 rpm.

8. A catalyst activating system as set forth in claim 7, wherein said second predetermined level of the engine speed is 3,500 rpm.

9. A catalyst activating system as set forth in claim 6, wherein in both of said first and second engine conditions the engine intake pressure is set at −400 mmHg or less.

10. A catalyst activating system as set forth in claim 1, wherein in said one operating mode, the intake and exhaust valves of said at least one of the cylinders are held in closed states thereof while in said another operating mode, the intake and exhaust valves of said at least one of the cylinders are opened and closed.

11. A catalyst activating system as set forth in claim 1, wherein the supply of fuel into said at least one cylinder is stopped when the engine temperature $T_W$ is in a range of $10°$ C.$\leq T_W \leq 40°$ C.

12. A catalyst activating system as set forth in claim 11, wherein even when the engine temperature $T_W$ exceeds $40°$ C., if a temperature of said catalyst is less than a predetermined level, the stopping of the fuel supply to said at least one cylinder is continued.

13. A catalyst activating system in a multi-cylinder internal combustion engine for activating a catalyst by increasing an amount of oxygen supplied to said catalyst, said engine including a plurality of cylinders, each cylinder having a fuel injection valve operatively associated therewith, at least one intake valve operatively associated therewith, at least one exhaust valve operatively associated therewith; and a catalytic converter having said catalyst therein, operatively coupled to said cylinders; said catalyst activating system comprising:

(a) detecting means for detecting operational conditions of said engine including engine temperature, engine intake pressure and engine speed;

(b) valve operating means for opening and closing said intake valves and said exhaust valves;

(c) valve opening and closing operation changing means operatively coupled to said valve operating means for changing the opening and closing operation of at least one of said intake and exhaust valves in at least one of said cylinders into at least two operating modes dependent on at least one of said engine intake pressure and said engine speed detected by said detecting means, wherein in one of said operating modes, said intake valves and exhaust valves are closed and in another of said operating modes at least one of said intake valves and one of said exhaust valves are opened for at least a predetermined period; and (d) control means for controlling the operation of said fuel injection valves to stop the supply of fuel into at least one said cylinders and for controlling the operation of said valve opening and closing operation changing means to operate in said one operating mode and said another operating mode, when said engine is at a temperature which is below a predetermined temperature, thereby permitting only air to be fed through said at least one of the cylinders to said catalyst, whereby the amount of oxygen provided to said catalyst is controlled thereby controlling the activity of said catalyst.

14. A catalyst activating system as set forth in claim 13, wherein said one operating mode corresponds to a first engine condition where the engine speed is below a first predetermined level, and said another operating mode corresponds to a second engine condition where the engine speed exceeds said first predetermined level but is below a second predetermined level, and wherein a number of cylinders through which only air is passed is larger in said another operating mode than in said one operating mode.

15. A catalyst activating system as set forth in claim 14, wherein said first predetermined level of the engine speed is 2,000 rpm.

16. A catalyst activating system as set forth in claim 15, wherein said second predetermined level of the engine speed is 3,500 rpm.

17. A catalyst activating system as set forth in claim 14, wherein in both of said first and second engine conditions, the engine intake pressure is set at −400 mmHg or less.

18. A catalyst activating system as set forth in claim 13, wherein in said one operating mode, the intake and exhaust valves of said at least one of the cylinders are held in closed states thereof while in said another operating mode, the intake and exhaust valves of said at least one of the cylinders are opened and closed.

19. A catalyst activating system as set forth in claim 13, wherein the supply of fuel into said at least one cylinder is stopped when the engine temperature $T_W$ is in a range of 10° C.$\leq T_W \leq$40° C.

20. A catalyst activating system as set forth in claim 19, wherein even when the engine temperature $T_W$ exceeds 40° C., if a temperature of said catalyst is less than a predetermined level, the stopping of the fuel supply to said at least one cylinder is continued.

* * * * *